(12) United States Patent
Zargari et al.

(10) Patent No.: US 7,274,576 B1
(45) Date of Patent: Sep. 25, 2007

(54) POWER CONVERTER WITH REDUCED COMMON MODE VOLTAGE

(75) Inventors: Navid Reza Zargari, Cambridge (CA); Steven Carmen Rizzo, Cambridge (CA); Yuan Xiao, Kitchener (CA); Bin Wu, Toronto (CA)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 11/365,234

(22) Filed: Mar. 1, 2006

(51) Int. Cl.
*H02M 1/12* (2006.01)
*H02J 3/01* (2006.01)

(52) U.S. Cl. .............................. 363/39; 363/35; 363/37

(58) Field of Classification Search ............ 363/34–37, 363/39, 40, 41, 127, 131, 132, 135, 136, 363/137
See application file for complete search history.

(56) References Cited

U.S. PATENT DOCUMENTS

| | | | | |
|---|---|---|---|---|
| 5,315,497 A | * | 5/1994 | Severinsky | ................... 363/34 |
| 5,661,390 A | * | 8/1997 | Lipo et al. | ................... 318/803 |
| 5,905,642 A | | 5/1999 | Hammond | |
| 6,154,378 A | * | 11/2000 | Peterson et al. | ............... 363/37 |
| 6,377,479 B1 | * | 4/2002 | Ayano et al. | .................. 363/40 |
| 6,617,814 B1 | | 9/2003 | Wu et al. | |
| 6,867,564 B1 | | 3/2005 | Wu et al. | |
| 2006/0227483 A1 | | 10/2006 | Akagi | |

* cited by examiner

*Primary Examiner*—Gary L Laxton
(74) *Attorney, Agent, or Firm*—John T. Pienkos; Alexander R. Kuszewski (57) ABSTRACT

An improved power converter that produces reduced-levels of common-mode voltages, or even entirely eliminates such voltages, is disclosed herein, along with a method of reducing common-mode voltages. In at least some embodiments, the improved power converter is equipped with common-mode filter inductors and a link coupling input and output ports of the power converter with one another to communicate a ground point associated with the input ports of the converter (and the source) to the load. Further, in at least some embodiments, the method includes providing common mode filter inductors as part of the converter, where the inductors are connected at least indirectly to at least one of a rectifier and an inverter of the converter, and communicating a grounded neutral from input ports of the converter to output ports of the converter by way of at least one additional linkage.

25 Claims, 7 Drawing Sheets

COMMON MODE VOLTAGE $V_{og}$

FIG. 4a

SPECTRUM OF COMMON MODE VOLTAGE $V_{og}$

POWER CONVERTER WITH REDUCED COMMON MODE VOLTAGE

FIELD OF THE INVENTION

The present invention relates to power conversion devices and, more particularly, to power conversion devices for outputting three-phase power that can be used by three-phase devices such as motors.

BACKGROUND OF THE INVENTION

A variety of power conversion devices capable of providing a variety of types and levels of power for a variety of different purposes are now available on the market. A number of these power conversion devices are designed to output three-phase, alternating current (AC) electrical power for use by three-phase AC machines and other devices. For example, in the field of electric motors and motor drives, a three-phase AC motor can be connected to a motor drive, which includes (and operates as) a power converter and provides three-phase AC electrical power to the motor in a controlled fashion. By controlling the currents (and voltages) applied to a given motor, the motor drive further is capable of controlling motor speed, torque and other motor performance characteristics.

Figure 1:
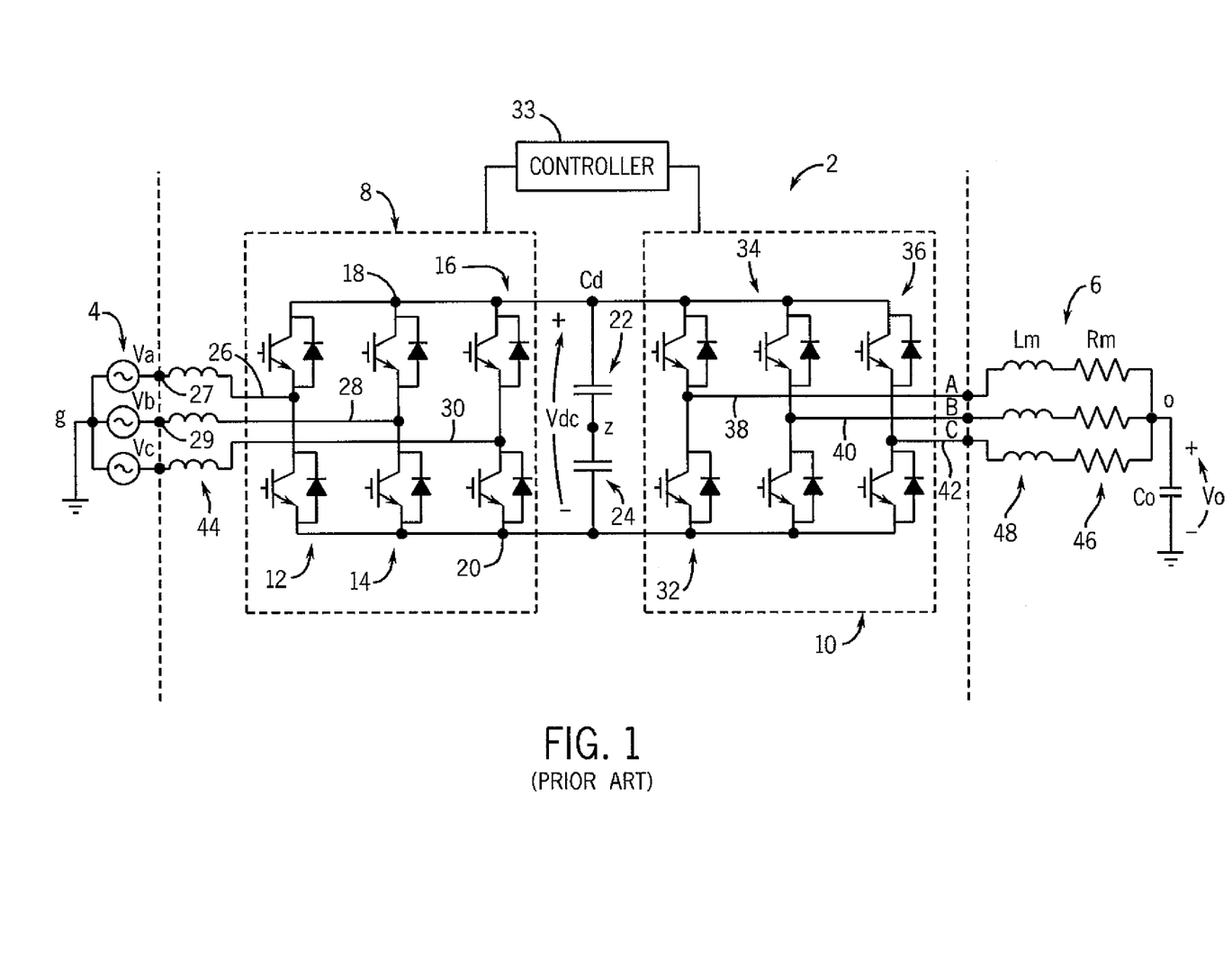
FIG. 1 is a schematic showing an exemplary Prior Art VSI power converter having a rectifier and an inverter coupled in between a three-phase voltage source and a three-phase load.

One type of power converter that is employed in some such motor drives is a voltage source inverter (VSI). Referring to FIG. 1, one such Prior Art VSI power converter 2 is shown in schematic form. As shown, three-phase AC input (or supply) power received from a three-phase AC voltage source 4, which can be a utility/power line or other source and can be modeled (as shown) as three separate voltage sources Va, Vb and Vc, respectively. The input power is converted by the VSI power converter 2 into three-phase AC output power that is appropriate for a load 6, which in this example is a three-phase AC motor (e.g., an induction or synchronous motor), and can be modeled as three resistors 46 respectively in series with three inductors that represent three different windings of the motor.

The VSI power converter 2 operates by way of two stages, a first stage that is a rectifier 8 that converts the AC input power into direct current (DC) power, and a second stage that is an inverter 10 that converts the DC power into the three-phase AC output power of desired frequency and amplitude for the load 6. In the embodiment of FIG. 1, the rectifier 8 is a pulse width modulated (PWM) rectifier that employs first, second and third pairs of insulated gate bipolar transistors (IGBTs) 12, 14 and 16, respectively. The IGBTs of each pair 12, 14 and 16 are coupled in series with one another between first and second nodes 18 and 20, respectively. Additionally, first and second capacitors 22 and 24 are coupled in series between the first and second nodes 18 and 20.

Further, first, second and third nodes 26, 28 and 30 between the respective pairs of IGBTs 12, 14 and 16, respectively, are coupled to first, second and third input ports 27, 29 and 31, respectively, of the VSI power converter 2 by way of respective input filter inductors 44, the input ports respectively receiving power from the respective voltage sources. As for the inverter 10, it also is a PWM device that employs first, second and third pairs of IGBTs 32, 34 and 36, respectively. Again, the IGBTs of each pair 32, 34 and 36 are coupled in series with one another between the first and second nodes 18 and 20, in parallel with the capacitors 22, 24 and the IGBT pairs of the rectifier 8. Further, first, second and third additional nodes 38, 40 and 42, respectively, are formed between the IGBTs of each pair 32, 34 and 36 and are coupled to the load 6, such that first, second and third output power phases (shown in FIG. 1 as A, B, and C) are provided to the load.

Each of the IGBTs of each of the pairs 12, 14, 16, 32, 34 and 36 is controlled by way of a controller 33 (e.g., a microprocessor) to switch on and off at appropriate times such that substantially DC power (e.g., a DC voltage) appears across the first and second nodes 18, 20 and so that the DC power in turn is converted into desired AC output power provided as the phases A, B, and C. Discontinuities and/or ripple introduced due to the pulsing of the IGBTs are largely smoothed out by the operation of the capacitors 22, 24. Although the rectifier 8 and inverter 10 are shown to employ IGBTs, in alternate embodiments the rectifier and/or inverter can employ other solid state semiconductor-based switching devices such as silicon-controlled rectifiers (SCRs), gate turn-off thyristors (GTOs), gate commutated thyristors (GCTs), or other switching devices. Further, in at least some embodiments, the rectifier 8 can simply employ diodes.

As the switching devices are activated in the rectifier 8 and/or the inverter 10, time-varying common-mode voltages are produced. The common-mode voltages appear in the output phases A, B, and C of the VSI power converter 2, and hence, on the motor windings of the motor load 6. Where a neutral (shown in FIG. 1 as a node g) associated with the input power source 4 is grounded, the common-mode voltage appears between the motor windings and ground. Assuming that, as shown, the motor windings of the motor load 6 are coupled together, the common-mode voltages appear as an overall common-mode voltage $V_o$ at a node 0, which can be understood as being coupled to actual ground by way of a stray capacitance $C_o$. While the common-mode voltages can include multiple components at different frequencies, commonly the predominant or largest component of a common-mode voltage is at three times the source frequency. Thus, for a typical three-phase AC source providing 60 Hz power, the predominant or largest component of the common-mode voltages that are generated by the power converter 2 will be at about 180 Hz.

Depending upon a variety of factors including the power levels involved, environmental or other operating conditions, and the design of the motor load 6 (or other load), common-mode voltages in some circumstances can become fairly high in amplitude and, in any event, can potentially reach levels that are beyond the insulation rating(s) of the motor windings (or other load rating). Consequently, running of the motor load 6 in a manner resulting in such common-mode voltages can risk damaging the motor or decrease its life expectancy. Further, although motors can be designed with high insulation ratings such that the motors will not be harmed by such common-mode voltages, not all motors are so designed and increasing the insulation ratings of a motor can increase the cost of a motor. Additionally, it would be desirable for motor manufacturers if they did not have to take into account the risks posed by common-mode voltages when designing their motors.

Given that it would be desirable to have power converters that did not generate common-mode voltages, or at least only generated common-mode voltages that were significantly reduced in comparison with those generated by conventional power converters, a variety of modified power converter designs have been developed or attempted. Yet each of these modified power converter designs either fails to reduce common-mode voltage levels to satisfactory levels or introduces other disadvantages. For example, some modified power converter designs attempt to reduce the levels of common-mode voltages that they generate by more carefully controlling the pulsing on and off of the IGBTs or other switching devices within the power converters. Yet such modified power converters are more complicated to operate and control, achieve their results at a cost to the power converters' modulation indices and/or THDs (total harmonic distortion levels) of voltage and current, and in any event fail to eliminate the common-mode voltages.

Other modified power converter designs attempt to compensate for and nullify the common-mode voltages by producing anti-common-mode voltages through the use of additional switches, or through the use of isolation transformers. However, the use of additional switches can increase the complexity of controlling operation of the power converters, and can increase the cost of the power converters by increasing the number of circuit components. Further, where transformers are employed, the transformers must be rated to handle the common-mode voltage levels. Also, the use of such transformers increases the cost of the power converters and, due to the size of the transformers, can increase the bulkiness of the power converters.

Still additional modified power converter designs employ additional passive L-C filters to suppress the common-mode voltages. The filters typically include both inductors to block the high-frequency common mode voltages and capacitors to shunt the high frequency common-mode voltages to ground. Conventionally, three-phase AC L-C filters are positioned between the inverter of the power converter and the load, e.g., three different L-C filters are implemented as part of (e.g., in series with) the output nodes 38, 40 and 42 between the IGBTs 32, 34 and 36 and the load 6 shown in FIG. 1, in association with each of the different phases A, B, and C. While the use of such filters does succeed in reducing the levels of common-mode voltages, the filters do not necessarily achieve desired reductions, particularly insofar as the filters associated with each of the different phases A, B, and C do not necessarily operate in a collective manner that might address imbalances between the common-mode voltages at the different phases A, B, and C.

For at least these reasons, therefore, it would be desirable if an improved power converter could be developed that generated reduced levels of common-mode voltages than conventional power converters, or even entirely eliminated such common-mode voltages. Further, it would be advantageous if such an improved power converter did not require significant numbers of costly additional components, require physically large or bulky components, and did not require more complicated control techniques to be implemented in relation to controlling the operation of its switching devices or other components. In at least some embodiments, it would be advantageous if such an improved power converter could serve as an improved drive that was capable of providing improved three-phase AC power with reduced levels of common-mode voltages (or no common-mode voltages) to three-phase AC motors or similar machines.

BRIEF SUMMARY OF THE INVENTION

The present inventors have recognized that at least some embodiments of an improved power converter generating reduced levels of common-mode voltages could be provided if one included, within the power converter, both inductive components to filter the common-mode voltages and additionally an independent linkage coupling the three output phases with the three input phases so as to effectively connect a neutral point of the load with a grounded neutral point associated with the voltage source. In at least some such embodiments, the power converters are power converters employing both rectifiers and inverters. Further, depending upon the embodiment, the inductive components can be positioned on the output side of the inverter, on the input side of the rectifier, and/or between the rectifier and the inverter. Also depending upon the embodiment, the independent linkage can include, and/or couple the output phases and input phases by way of, capacitors and/or resistors.

More particularly, the present invention in at least some embodiments relates to a three-phase power converter. The three-phase power converter includes a rectifier section that receives first, second and third AC input voltages at first, second and third input ports of the rectifier section, respectively, and an inverter section having at least one input node that is coupled at least indirectly to at least one output node of the rectifier section, where the inverter section produces first, second and third output AC voltages at first, second and third output ports of the inverter section, respectively. The three-phase power converter further includes at least one additional linkage coupling the first, second and third output ports with the first, second and third input ports, whereby a grounded neutral point associated with the first, second and third AC input voltages is thereby in communication with the first, second and third output ports.

Further, in at least some embodiments the present invention includes a voltage source inverter (VSI) power converter. The VSI power converter includes first means for converting first, second and third phases of AC input power received respectively at first, second and third input ports into DC power, and second means for converting the DC power into first, second and third phases of AC output power provided respectively at first, second and third output ports. The VSI power converter also includes third means for filtering common-mode energy generated at least in part by at least one of the first and second means, and fourth means for linking the AC output ports with the AC input ports, whereby a grounded neutral associated with the AC input ports is communicated to the AC output ports.

Additionally, in at least some embodiments, the present invention relates to a method of reducing a common-mode voltage associated with a VSI power converter. The method includes providing a plurality of common mode filter inductors as part of the VSI power converter, where the filter inductors are connected at least indirectly to at least one of a rectifier section and an inverter section of the VSI power converter. The method further includes communicating a grounded neutral from a plurality of input ports of the VSI power converter to a plurality of output ports of the VSI power converter by way of at least one additional linkage.

BRIEF DESCRIPTION OF THE DRAWINGS

FIGS. 4(*a*)-4(*d*) are first, second, third and fourth graphs that show, respectively, exemplary time variation of the common mode voltage, exemplary frequency spectrum characteristics of the common mode voltage, exemplary time variation of output phase to ground voltage, and exemplary time variation of output phase current for the Prior Art VSI power converter of FIG. 1.

DETAILED DESCRIPTION OF THE PREFERRED EMBODIMENT

Figure 2:
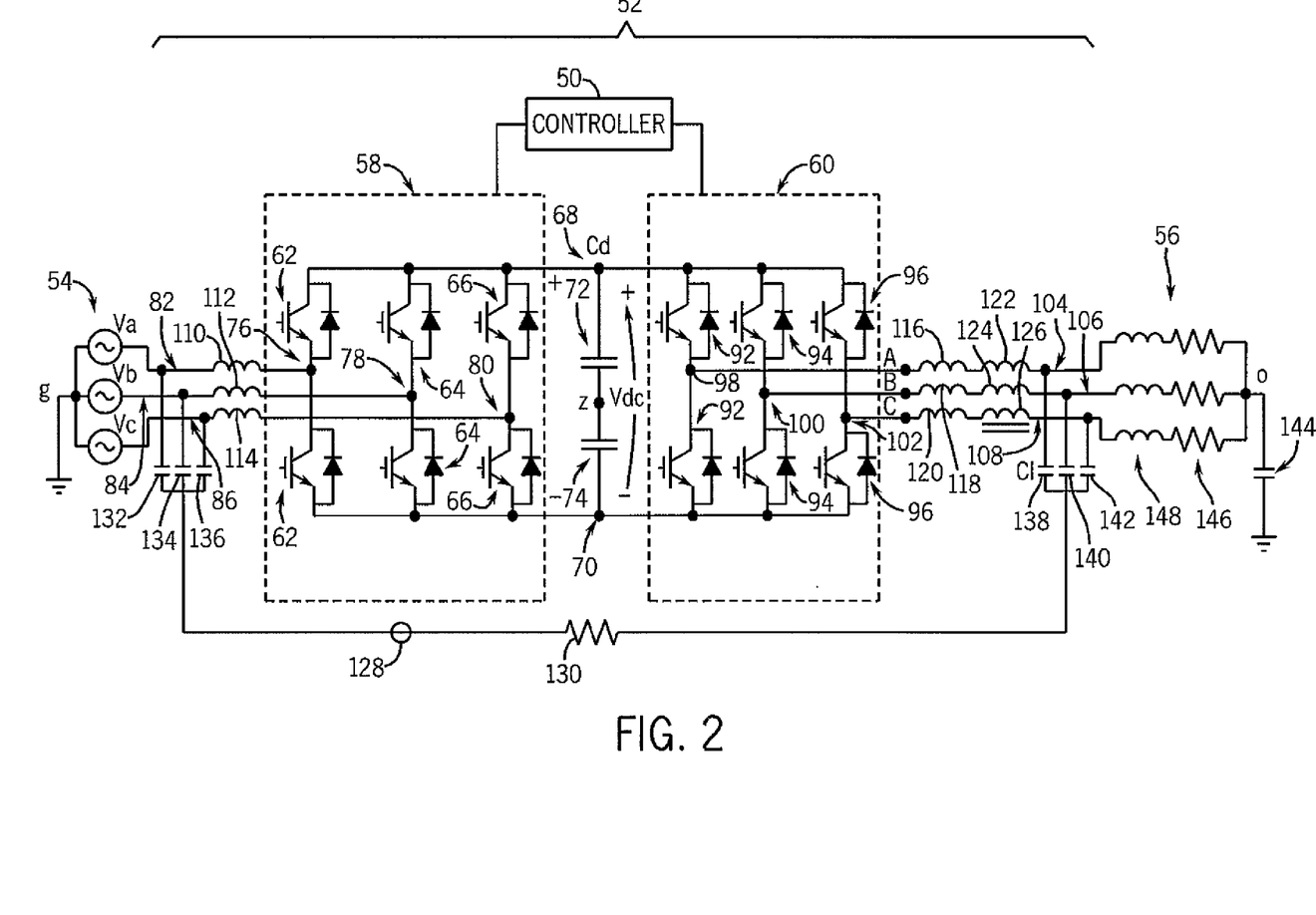
FIG. 2 is a schematic showing an improved VSI power converter in accordance with at least some embodiments of the present invention, coupled in between a three-phase voltage source and a three-phase load.

Referring to FIG. 2, a schematic is provided of a first exemplary improved power converter 52 that is coupled to a three-phase AC voltage source 54 and a three-phase load 56. In the present embodiment, the power converter 52 is a voltage source inverter (VSI) that, as described in further detail below, includes a first stage that is a rectifier 58 and a second stage that is an inverter 60. The three-phase AC voltage source 54 is intended to be representative of a variety of AC voltage sources that could provide first, second and third phases of AC electrical power to the power converter 52 including, for example, a utility/power line or other voltage source, and is modeled as three separate voltage sources Va, Vb, and Vc. In the embodiment shown, the load 56 is a three-phase AC motor (e.g., an induction or synchronous motor), and is modeled as three resistors 146 respectively in series with three inductors 148 that represent three different windings of the motor, respectively. However, the load 56 is also intended to be representative of other three-phase AC loads including, for example, other electromechanical machines.

Further as shown in FIG. 2, the rectifier 58 of the power converter 52 includes first, second and third pairs of insulated gate bipolar transistors (IGBTs) 62, 64 and 66, respectively. The IGBTs of each pair 62, 64 and 66 are coupled in series with one another between first and second nodes 68 and 70, respectively. Additionally as shown, first and second capacitors 72 and 74 are coupled in series between the first and second nodes 68 and 70. The capacitors 72, 74 serve to eliminate/reduce ripple in the voltage output by the rectifier 8.

Additionally, first, second and third additional nodes 76, 78 and 80, which are respectively between the IGBTs of the first, second and third pairs 62, 64 and 66, respectively, are coupled to first, second and third input ports 82, 84 and 86, respectively of the rectifier 58, which also are input ports of the overall power inverter 52. In the present embodiment, the first, second and third input ports 82, 84 and 86 are respectively coupled to the first, second and third additional nodes 76, 78 and 80, respectively, by way of first, second and third input filter inductors 110, 112 and 114, respectively. The rectifier 58 operates to convert the three phases of AC power received at the first, second and third input ports 82, 84 and 86 from the respective voltage sources Va, Vb and Vc into DC power with a DC voltage output across the nodes 68, 70. The rectifier 58 achieves the AC to DC conversion by way of appropriate switching on and off (or pulsing on and off) of the pairs of IGBTs 62, 64 and 66, which is governed by a controller 50, which can be a microprocessor or other control device (e.g., a programmable logic device).

As for the inverter 60, it also is a PWM device that employs first, second and third pairs of IGBTs 92, 94 and 96, respectively, where the IGBTs of each pair 92, 94 and 96 are coupled in series with one another between the first and second nodes 68 and 70 (in parallel with the capacitors 72, 74 and the IGBT pairs of the rectifier 58). Switching operation of the pairs of IGBTs 92, 94 and 96 also is governed by the controller 50. Fourth, fifth and sixth additional nodes 98, 100 and 102, respectively, which are located between the IGBTs of the first, second and third pairs 92, 94 and 96, respectively, output first, second and third output AC voltages (shown as A, B and C) and are coupled respectively to first, second and third output ports 104, 106 and 108, respectively, which are output ports of the power converter 52. More particularly, the fourth, fifth and sixth additional nodes 98, 100 and 102 are respectively coupled to the respective output ports 104, 106 and 108 by way of respective pairs of series-connected inductors, namely, inductors 116 and 122, inductors 118 and 124, and inductors 120 and 126. Each of the inductors 116, 118 and 120 is an output filter inductor, while each of inductors 122, 124 and 126 is a common mode filter inductor that serves to filter out common mode voltage(s) and/or oppose common mode currents. As shown, the three common mode filter inductors 122, 124 and 126 are magnetically coupled to one another so as to be mutually inductive.

Additionally as shown, the first, second and third input ports 82, 84 and 86 are respectively coupled to the first, second and third output ports 104, 106 and 108, respectively, by way of an additional link 128. More particularly, the first, second and third input ports 82, 84 and 86 are each coupled to a resistor 130 by way of first, second and third capacitors 132, 134 and 136, respectively, and the resistor 130 in turn is coupled to each of the first, second and third output ports 104, 106 and 108 by way of fourth, fifth and sixth capacitors 138, 140, and 142, respectively. The additional link 128 provides a common-mode current pass and the resister 130 serves as a damping resistor. By way of the additional link 128 formed by way of the resistor 130 and the capacitors 132-142, a ground of the voltage source 54, labeled g, is communicated from the input ports 82-86 to the output ports 104-108. Consequently, not only are the common-mode voltages filtered out by the inductors 122-126, but also the ground is communicated to the load 56 such that a ground terminal of the load, labeled o, is effectively coupled to actual ground. Thus, the ground terminal o does not have a large non-zero voltage, and the voltage of ground terminal o does not oscillate substantially about actual ground g by way of any stray capacitance 144. As a result, the common-mode voltages generated by the operation of the power converter 52 are substantially reduced, if not eliminated.

While FIG. 2 shows one embodiment of the power converter 52, the present invention is also intended to encompass other embodiments of power converters, particularly other VSI power converters. For example, in another embodiment, the common mode filter inductors 122, 124 and 126 shown in FIG. 2 could be moved from the locations shown in FIG. 2 instead to locations between the input ports 82, 84 and 86, and the inductors 110, 112 and 114, respectively. In further embodiments, the inductors 116 and 122 could be unified as a single inductor, as could the inductors 118 and 124, and the inductors 122 and 126. Similarly, in embodiments where the inductors 122, 124 and 126 were moved to the rectifier-side of the power converter 52, the inductor 122 could be unified with the inductor 110 as a single inductor, as could the inductor 124 with the inductor 112 and the inductor 126 with the inductor 114. Further, insofar as the pairs of inductors 116 and 122, 118 and 124, and 120 and 126 are series-connected, the relative positions of the inductors of each pair of inductors could be reversed (the same would be true if the inductors 122, 124 and 126 were positioned on the rectifier-side of the power converter 52). The particular switching devices used in the rectifier 58 and the inverter 60 could also be varied from the IGBTs shown.

Figure 3:
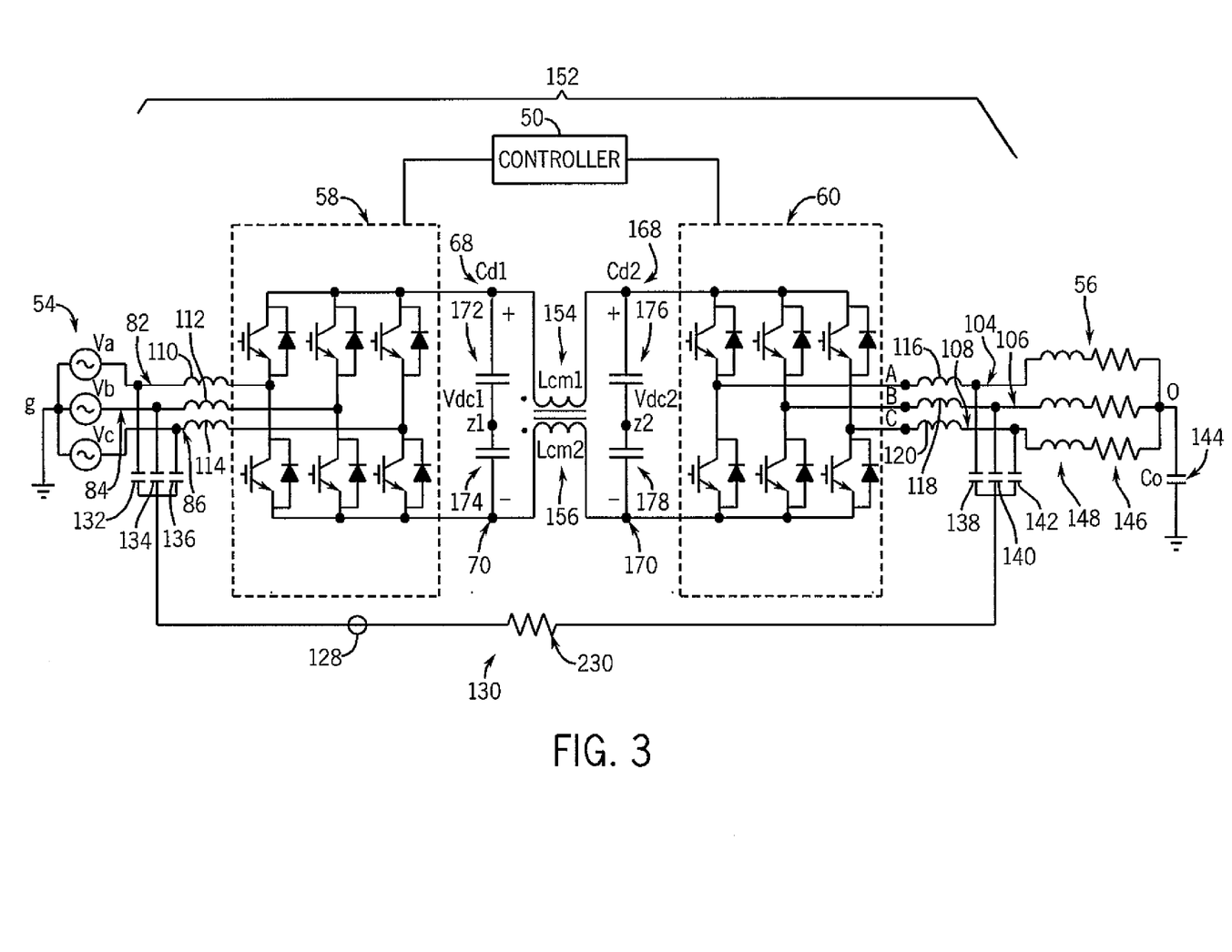
FIG. 3 is a schematic showing another improved VSI power converter in accordance with at least some additional embodiments of the present invention, coupled in between a three-phase voltage source and a three-phase load.
Figure 4A:
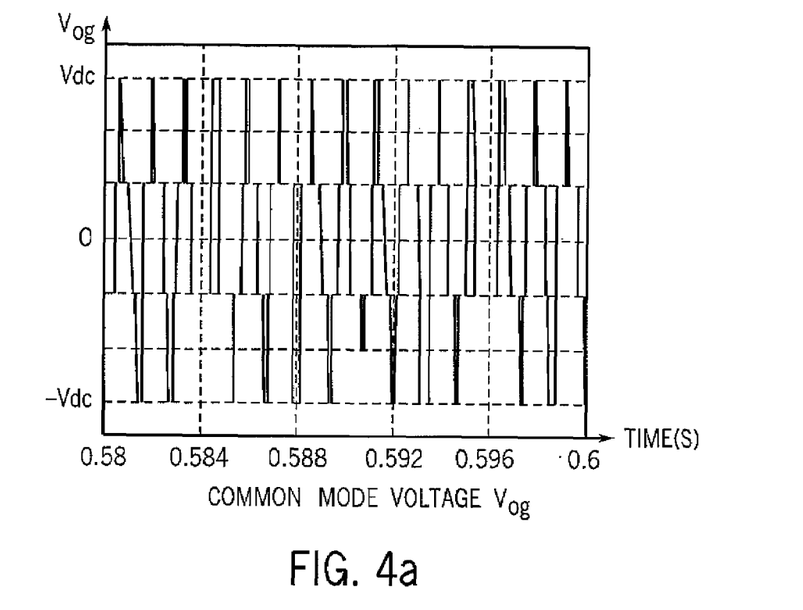
Figure 4B:
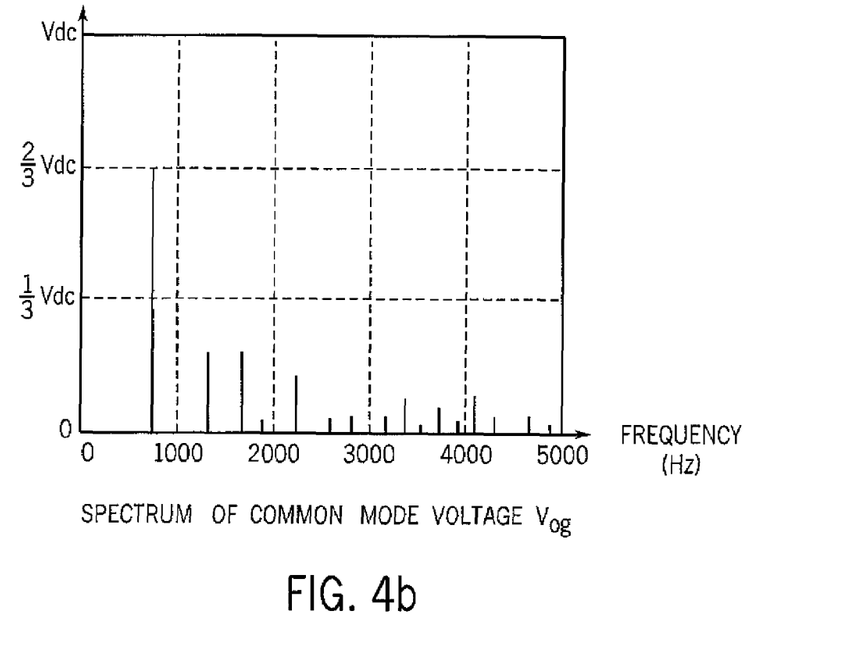
Figure 4C:
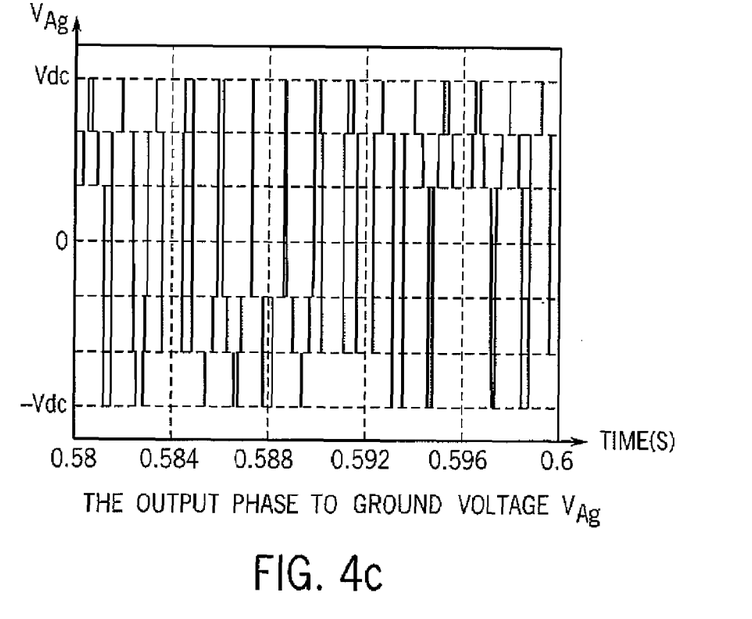
Figure 4D:
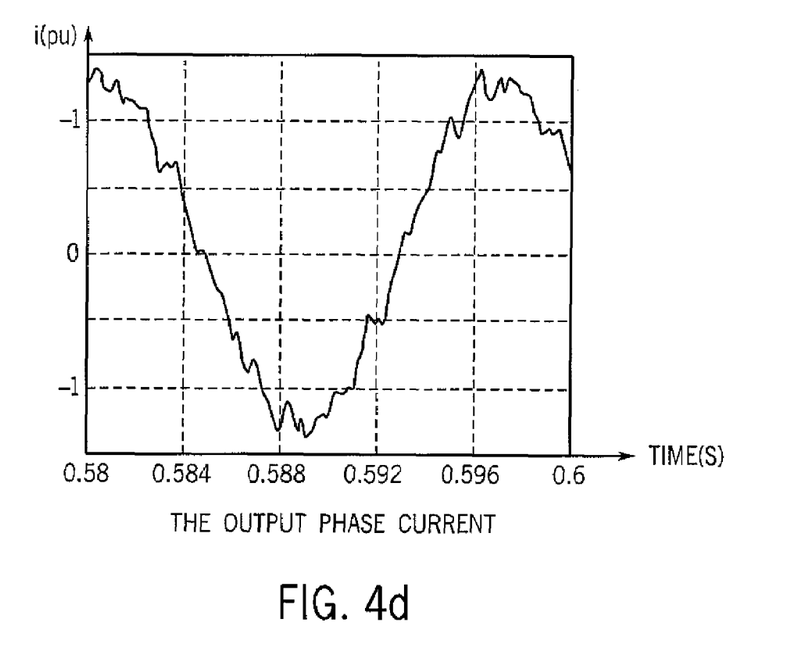
Figure 5A:
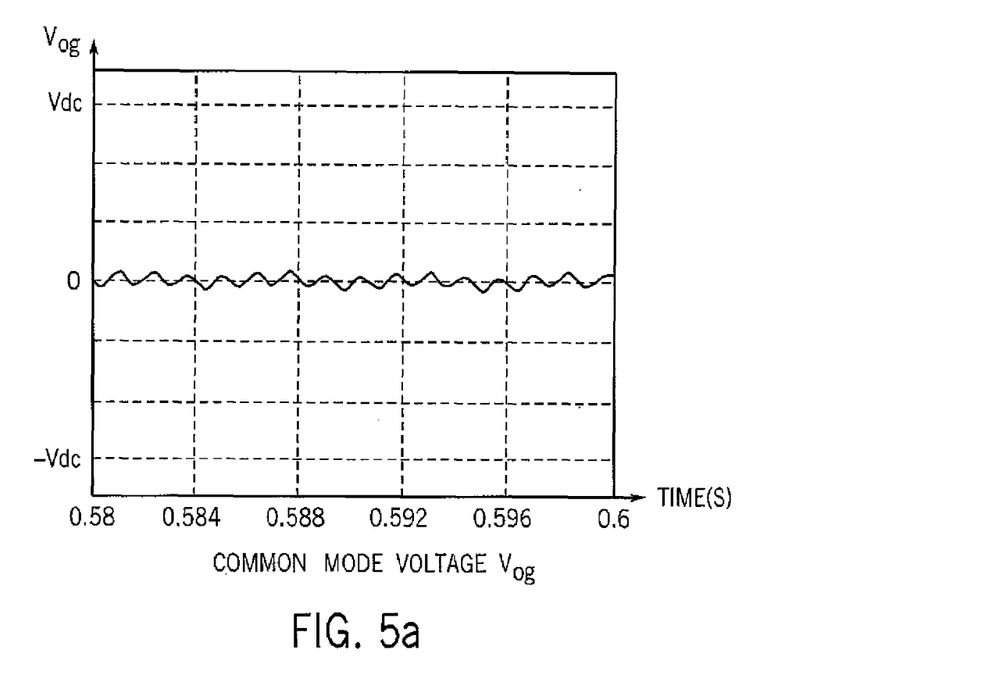
FIGS. 5(a)-5(d) are first, second, third and fourth graphs that show, respectively, exemplary time variation of the common mode voltage, exemplary frequency spectrum characteristics of the common mode voltage, exemplary time variation of output phase to ground voltage, and exemplary time variation of output phase current for the exemplary improved VSI power converter of FIG. 3.
Figure 5B:
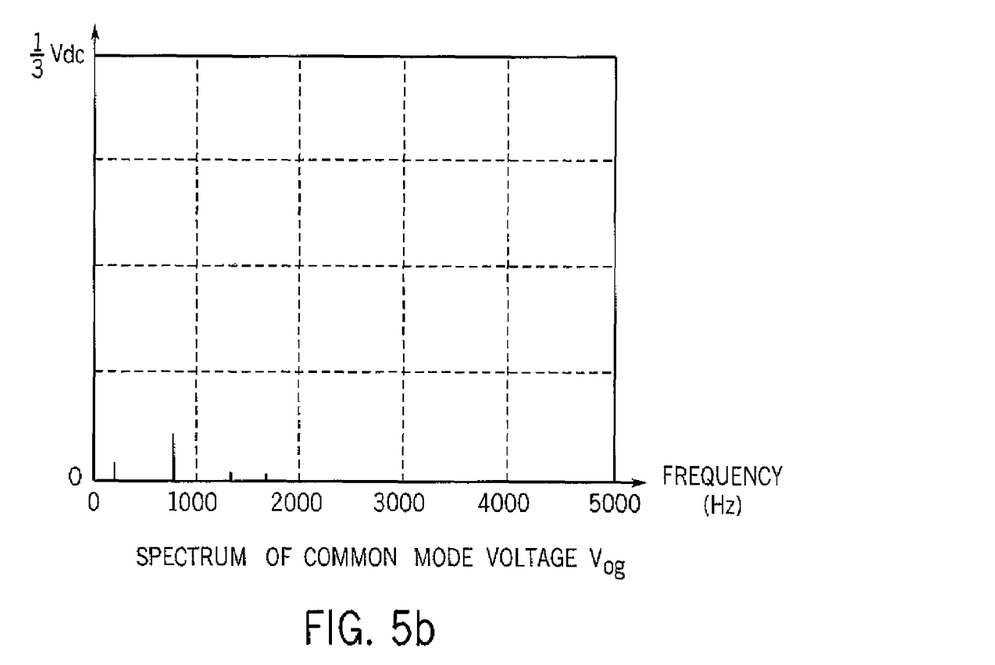
Figure 5C:
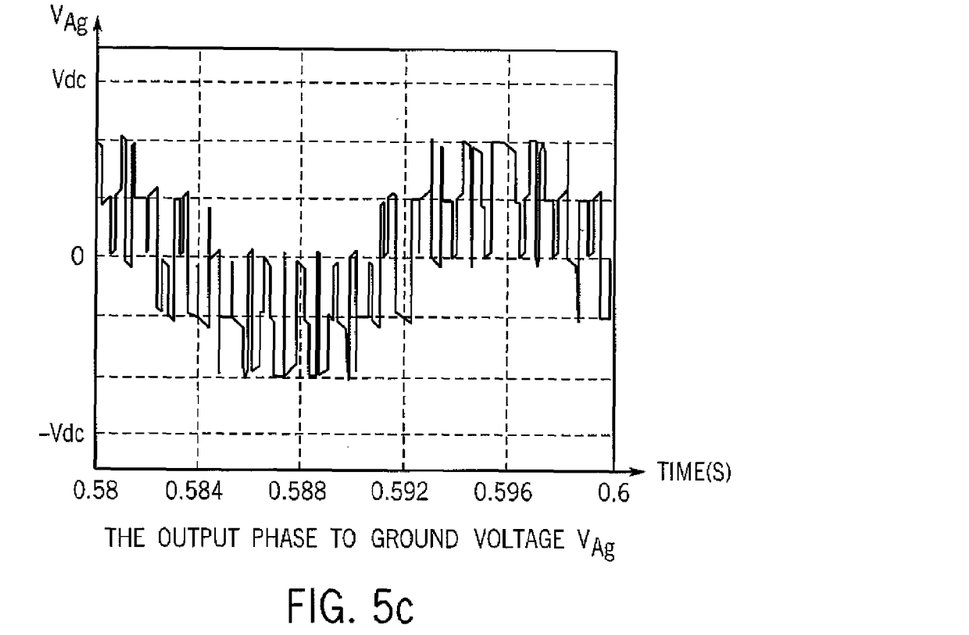
Figure 5D:
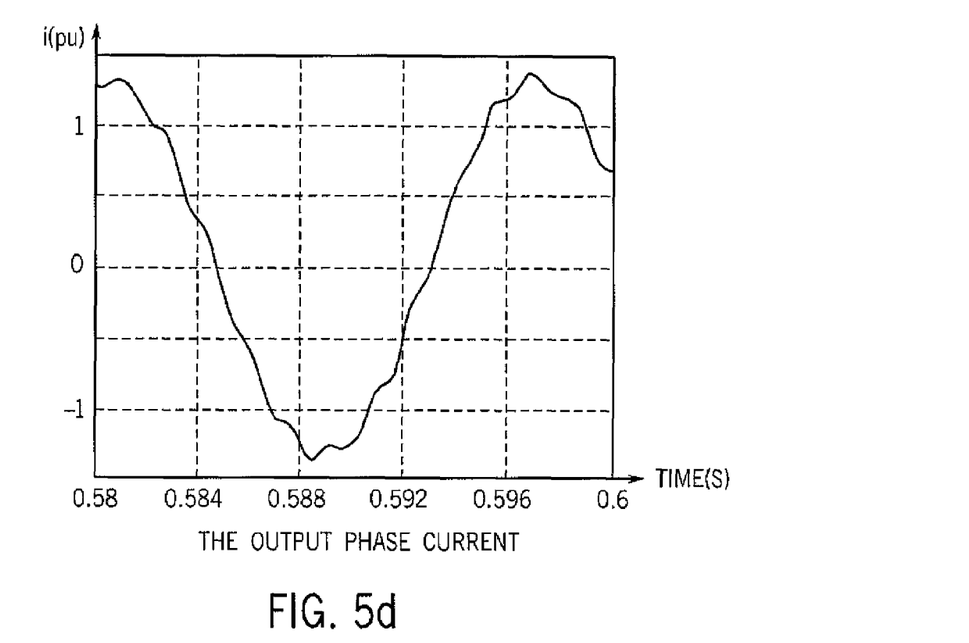

Turning to FIG. 3, a further exemplary embodiment of improved power converter 152 is shown to be coupled between the same three-phase voltage source 54 and three-phase load 56 as were shown in FIG. 2. The power converter 152 is largely the same as the power converter 52 in terms of its controller 50, rectifier 58, and inverter 60 (and associated IGBTs). Additionally, the power converter 152 has the identical additional link 128 with the resistor 130 and the capacitors 132-142 linking the input ports 82-86 of the power converter with the output ports 104-108 of the power converter. Further, the power converter 152 has the same inductors 110-114 and 116-120 connected between the input ports 82-86 and the rectifier 58 and between the inverter 60 and the output ports 104-108, respectively. However, in contrast to the power converter 52, the power converter 152 does not employ the three common mode filter inductors 122-126 (either between the inverter 60 and the output ports 104-108 or between the rectifier 58 and the input ports 82-86), but rather employs a modified configuration in which only first and second intermediate inductors 154 and 156 are employed.

More particularly as shown, rather than employing the inductors 122-126 in connection with each of three phases either being input to the rectifier 58 or being output by the inverter 60, the power converter 152 instead employs the two intermediate inductors 154, 156 in between the rectifier 58 and the inverter 60 such that the inductors form a choke that affects the DC power being communicated between the rectifier and the converter. As shown, the inverter 60 is not directly coupled to the rectifier 58 or to its first and second nodes 68 and 70. Rather, the nodes of the inverter 60 between which the pairs of IGBTs 92-96 are coupled, which are referred to as first and second nodes 168 and 170 to distinguish those nodes from the first and second nodes 68 and 70 of the rectifier 58 (albeit the nodes of the inverter 60 would physically be the same as the nodes of the inverter described with reference to FIG. 2), are respectively coupled to the first and second inductors 154 and 156, respectively, which in turn are coupled to the first and second nodes 68 and 70 of the rectifier 58. Additionally, while first and second capacitors 172 and 174 (which serve to remove ripple) are series-connected between the first and second nodes 68 and 70 of the rectifier 58, third and fourth capacitors 176 and 178 (which also serve to remove ripple) additionally are series-connected between the nodes 168 and 170 of the inverter 60.

Further as shown, the first and second inductors 154 and 156 are magnetically coupled to provide mutual inductance between those chokes, and serve to filter common mode voltages. By utilizing two inductors 154, 156 instead of the three inductors 122, 124 and 126 shown in FIG. 2, the power converter 152 of FIG. 3 has certain advantages over the power converter 52 of FIG. 2. In particular, because inductors require relatively large winding structures, the embodiment of FIG. 3 in which only two inductors are employed can be physically smaller in comparison with the embodiment of FIG. 2 employing three inductors. Also, the negative effects of the reactive current due to the load 56, which include increased ratings and winding losses, are reduced by moving the chokes to the DC stage of the power converter as shown in FIG. 3.

The exact degree to which the common-mode voltages are reduced due to the operation of the common-mode filter inductors 122-126 and the additional link 128 of the power converter 52, as well as due to the operation of the common-mode filter inductors 154 and 156 and the additional link 128 of the power converter 152, can vary depending upon the embodiment. The reduction in the common-mode voltages, however, can be substantial. Turning to FIGS. 4 and 5, for example, the common-mode voltages produced at the output of a conventional power converter (e.g., the power converter 2 of FIG. 1) can be quite large, as shown in FIG. 4(*a*). By comparison, the power converter 152 of FIG. 3 produces substantially no common-mode voltages, as shown in FIG. 5(*a*). (It should be noted that the particular time varying common voltages shown in FIGS. 4(*a*) and 5(*a*) are only intended to be exemplary.)

In addition to showing exemplary time variation of common mode voltages for the power converters 2 and 152 in FIGS. 4(*a*) and 5(*a*), FIGS. 4(*b*) and 5(*b*) respectively show exemplary frequency spectra of the common mode voltages produced by the respective power converters 2 and 152, FIGS. 4(*c*) and 5(*c*) respectively show exemplary time variation of the output phase to ground voltages of the respective power converters 2 and 152 (e.g., the voltages between the nodes labeled A in FIGS. 1 and 3 and ground), and FIGS. 4(*d*) and 5(*d*) respectively show exemplary time variation of output phase currents of the respective power converters 2 and 152. As shown, the magnitudes of the common mode voltage spectra produced by the power converter 152 of FIG. 3 as shown in FIG. 5(*b*) are much less than the magnitudes of the common mode voltage spectra produced by the power converter 2 of FIG. 1 as shown in FIG. 4(*b*). Also, the ripple in each of the output phase to ground voltage and the output phase current produced by the power converter 152 as shown in FIGS. 5(*c*) and 5(*d*), respectively, is much less than the ripple in each of the output phase to ground voltage and the output phase current produced by the power converter 2 as shown in FIGS. 4(*c*) and 4(*d*), respectively. It should further be noted that the results shown in FIGS. 5(*a*)-5(*d*), although particularly pertaining to the power converter 152 shown in FIG. 3, are also substantially representative of the corresponding signals that would be produced by the power converter 52 of FIG. 2.

In addition to the above-described embodiments, still further embodiments of the present invention are also possible. For example, while the additional links 128 described above include two sets of three capacitors coupled to a single resistor, in other embodiments the additional links could take other forms. For example, one of the sets of three capacitors (either those connected to the input ports or those connected to the output ports) could be replaced with a set of three resistors. As in the examples shown in FIGS. 2 and 3, the resistor 130 or 230 would still be present as an intermediate device to which all of the three capacitors and all of the three resistors were connected. Further for example, in each of the embodiments shown in FIGS. 2 and 3, pairs of two capacitors (e.g., capacitors 72 and 74, capacitors 172 and 174, and capacitors 176 and 178) are connected in series between the nodes 68 and 70 or 168 and 170. In other embodiments, however, the capacitors of each pair can be combined into a single capacitor.

Additionally, in embodiments employing pairs of capacitors as shown in FIGS. 2 and 3, it is possible to modify the power converters to include additional switching structures connected between the output ports 104-108 and one or more of the intermediate nodes existing between the capacitors of each pair. For example, with respect to the power converter shown in FIG. 2, the power converter could be modified to include additional switching components that coupled each of the respective first, second and third output ports 104-108 to an intermediate node labeled z between the capacitors 72 and 74. By reconfiguring the power converter 52 in this manner, a modified version of that power converter having a three-level topology (or "neutral point clamped bridge" topology) can be achieved. Similar modifications could be made to the power converter 152 of FIG. 3, in which the output ports 104-108 were coupled to an intermediate node between the capacitors 176 and 178 labeled z2 (or even between those output ports and the intermediate node labeled z1 between the capacitors 172 and 174).

The present invention is intended to encompass a wide variety of power converters not limited to those described above. Depending upon the embodiment, the power converters can be utilized in connection with low voltage/low power (e.g., voltages up to 1100 volts AC), medium voltage/medium power (e.g., between 2300 and 7200 volts AC), and even high voltage/high power systems. While the power converters 52 and 152 employ particular designs of a rectifier and an inverter having particular bridge designs (e.g., configurations of switching and/or rectification devices), the present invention is also intended to encompass other embodiments of power converters employing other designs of rectifiers and inverters, including other designs of rectifiers and inverters with different bridge arrangements. Further, as noted above, the particular switching devices employed in the inverters need not be IGBTs, but rather could also be SCRs, GTOs, GCTs, and other switching devices. Likewise, the switching devices employed in the rectifiers need not be IGBTs, but also could instead be SCRs, GTOs, GCTs, other switching devices, or even non-switching devices such as diodes.

Additionally, while the above-described embodiments are voltage source inverter (VSI) power converters, the present invention is also intended to encompass current source inverter (CSI) power converters. In VSI power converters such as those discussed above, the DC link portion of the power converter (that is, those components of the power converter that are connected between the rectifier and the inverter, such as the capacitors 72, 74, 172, 174, 176, 178 and inductors 154, 156 discussed above) generally includes one or more capacitors that are coupled between either the pair of output terminals of the rectifier or the pair of input terminals of the inverter, or both (e.g., the capacitors 72, 74, 172, 174, 176 and 178). Nevertheless, the present invention is also intended to encompass embodiments that are CSI power converters, such that the DC link portion of the power converter includes two or more inductors that link the respective output ports of the rectifier with the respective input ports of the inverter (e.g., with one inductor linking ports 68 and 168 of FIG. 3, and another inductor linking ports 70 and 170). In such embodiments, common-mode chokes corresponding to the common mode filter inductors 154, 156 would still be employed, for example, as shown in FIG. 2 proximate the output ports of the power converter, or respectively in series with the inductors of the DC link portion between the output ports of the rectifier and the input ports of the inverter.

It is specifically intended that the present invention not be limited to the embodiments and illustrations contained herein, but include modified forms of those embodiments including portions of the embodiments and combinations of elements of different embodiments as come within the scope of the following claims.

We claim:

1. A three-phase power converter comprising:
a rectifier section that receives first, second and third AC input voltages at first, second and third input ports of the rectifier section, respectively;
an inverter section having at least one input node that is coupled at least indirectly to at least one output node of the rectifier section, wherein the inverter section produces first, second and third output AC voltages at first, second and third output ports of the inverter section, respectively; and
at least one additional linkage coupling the first, second and third output ports with the first, second and third input ports not by way of a load of the power converter, whereby a grounded neutral point associated with the first, second and third AC input voltages is thereby in communication with the first, second and third output ports.

2. The three-phase power converter of claim 1, wherein the at least one additional linkage includes first, second and third capacitors coupled respectively between the first, second and third output ports and a first intermediate node, fourth, fifth and sixth capacitors coupled respectively between the first, second and third input ports and a second intermediate node, and a resistor coupling the first and second intermediate nodes.

3. The three-phase power converter of claim 1, wherein the at least one additional linkage includes first, second and third capacitors coupled respectively between the first, second and third output ports and a first intermediate node, first, second and third resistors coupled respectively between the first, second and third input ports and a second intermediate node, and a fourth resistor coupling the first and second intermediate nodes.

4. The three-phase power converter of claim 1, wherein the at least one additional linkage includes first, second and third resistors coupled respectively between the first, second and third output ports and a first intermediate node, first, second and third capacitors coupled respectively between the first, second and third input ports and a second intermediate node, and a fourth resistor coupling the first and second intermediate nodes.

5. The three-phase power converter of claim 1, wherein the at least one additional linkage includes at least one damping resistor.

6. The three-phase power converter of claim 1, wherein the converter is one of a voltage source inverter (VSI) and a current source inverter (CSI).

7. The three-phase power converter of claim 1, wherein the inverter section includes a plurality of switching devices.

8. The three-phase power converter of claim 7, wherein the switching devices are selected from the group consisting of insulated gate bipolar transistors IGBTs, silicon-controlled rectifiers (SCRs), gate turn-off thyristors (GTOs), and gate commutated thyristors (GCTs).

9. The three-phase power converter of claim 1, wherein the rectifier section includes at least one of a plurality of switching devices and a plurality of diodes.

10. The three-phase power converter of claim 1, wherein the at least one output node of the rectifier includes first and second output nodes, wherein the at least one input node of the inverter includes first and second input nodes, wherein the respective first and second output nodes are coupled at least indirectly to the first and second input nodes, respectively, and wherein a first capacitor is coupled between at least one of the first and second output nodes of the rectifier section and the first and second input nodes of the inverter section.

11. The three-phase power converter of claim 10, wherein the rectifier produces a first substantially DC voltage across the first and second output nodes, and the inverter receives across the first and second input nodes at least one of the first substantially DC voltage and a second substantially DC voltage based at least in part upon the first substantially DC voltage.

12. The three-phase power converter of claim 10, further comprising a second capacitor coupled in series with the first capacitor, between the first and second output nodes, and an additional node existing between the first and second capacitors.

13. The three-phase power converter of claim 12, wherein the three-phase power converter has a three-level topology in which each of the first, second and third output ports are coupled to at least one of the additional node and a further node by way of at least one additional switching device.

14. The three-phase power converter of claim 1, further comprising at least one filter component that at least one of forms part of the rectifier section, forms part of the inverter section, and is coupled between the rectifier and inverter sections, wherein the filter component is configured to filter out at least a portion of a common-mode signal.

15. The three-phase power converter of claim 14, wherein the at least one filter component includes at least one inductor.

16. The three-phase power converter of claim 15, wherein the at least one inductor includes first and second inductors, wherein the first inductor is coupled between a first output node of the rectifier and a first input node of the inverter, and wherein the second inductor is coupled between a second output node of the rectifier and a second input node of the inverter.

17. The three-phase power converter of claim 15, wherein the at least one inductor includes at least two inductors, and wherein the at least two inductors are mutually inductive.

18. The three-phase power converter of claim 15, wherein the at least one inductor includes first, second and third inductors within the inverter section, coupled at least indirectly between first, second and third pairs of switching devices of the inverter section, respectively, and the first, second and third output ports, respectively.

19. The three-phase power converter of claim 15, wherein the at least one inductor includes first, second and third inductors within the rectifier section, coupled at least indirectly between first, second and third pairs of rectification devices of the rectifier section, respectively, and the first, second and third input ports, respectively.

20. The three-phase power converter of claim 1, wherein the power converter operates as a motor drive, and wherein the power converter serves to reduce a common-mode voltage experienced by a motor coupled to and driven by the motor drive, the motor being the load.

21. A voltage source inverter (VSI) power converter comprising:
first means for converting first, second and third phases of AC input power received respectively at first, second and third input ports into DC power;
second means for converting the DC power into first, second and third phases of AC output power provided respectively at first, second and third output ports;
third means for filtering common-mode energy generated at least in part by at least one of the first and second means; and
fourth means for linking the AC output ports with the AC input ports, not by way of a ground connection or a load of the power converter, whereby a grounded neutral associated with the AC input ports is communicated to the AC output ports.

22. The VSI power converter of claim 21, further comprising first and second capacitors coupled between first and second intermediate nodes existing between the first means and the second means.

23. A method of reducing a common-mode voltage associated with a VSI power converter, the method comprising:
providing a plurality of common mode filter inductors as part of the VSI power converter, wherein the filter inductors are connected at least indirectly to at least one of a rectifier section and an inverter section of the VSI power converter; and
communicating a grounded neutral from a plurality of input ports of the VSI power converter to a plurality of output ports of the VSI power converter by way of at least one additional linkage and not a load of the power converteer.

24. The method of claim 23, wherein no portion of the at least one additional linkage forming a direct path between the input ports and the output ports is connected directly to ground, and wherein the communicating of the grounded neutral results in a reduction of the common-mode voltage experienced by a load of the VSI power converter.

25. The VSI power converter of claim 21, wherein the power converter serves to reduce a common-mode voltage experienced by the load coupled to the power converter.

* * * * *